(12) United States Patent
van den Berg

(10) Patent No.: US 6,796,271 B2
(45) Date of Patent: Sep. 28, 2004

(54) DEVICE FOR AUTOMATICALLY MILKING AN ANIMAL

(75) Inventor: Karel van den Berg, Bleskensgraaf (NL)

(73) Assignee: Lely Enterprises A.G., Zug (CH)

( * ) Notice: Subject to any disclaimer, the term of this patent is extended or adjusted under 35 U.S.C. 154(b) by 0 days.

(21) Appl. No.: 10/249,955

(22) Filed: May 22, 2003

(65) Prior Publication Data

US 2003/0226512 A1 Dec. 11, 2003

(30) Foreign Application Priority Data

Jun. 6, 2002 (NL) .............................................. 1020784

(51) Int. Cl.⁷ .................................................. A01J 5/04
(52) U.S. Cl. .................................. 119/14.43; 119/14.01
(58) Field of Search ........................... 119/14.43, 14.02, 119/14.44, 14.14, 14.38, 14.08, 14.42

(56) References Cited

U.S. PATENT DOCUMENTS

| | | | | |
|---|---|---|---|---|
| 2,627,840 A | * | 2/1953 | Mayer ..................... | 119/14.01 |
| 2,718,208 A | | 9/1955 | Tanner | |
| 4,011,838 A | * | 3/1977 | Nordegren et al. ...... | 119/14.08 |
| 5,080,040 A | * | 1/1992 | van der Lely et al. .... | 119/14.09 |
| 5,090,359 A | * | 2/1992 | Pettersson et al. ....... | 119/14.08 |
| 5,419,280 A | * | 5/1995 | Musha et al. ............ | 119/14.28 |
| 5,651,329 A | * | 7/1997 | van den Berg et al. ... | 119/14.02 |
| 6,009,832 A | * | 1/2000 | Innings et al. ........... | 119/14.02 |
| 6,009,833 A | * | 1/2000 | van der Lely ........... | 119/14.02 |
| 6,494,163 B1 | * | 12/2002 | Oort .......................... | 119/14.1 |
| 6,561,126 B2 | * | 5/2003 | Forsen et al. ............. | 119/14.02 |
| 6,598,560 B1 | * | 7/2003 | van den Berg .......... | 119/14.08 |
| 2002/0104484 A1 | * | 8/2002 | Gentner et al. .......... | 119/14.02 |
| 2003/0019431 A1 | * | 1/2003 | van den Berg et al. ... | 119/14.02 |
| 2003/0154924 A1 | * | 8/2003 | Birk et al. ................ | 119/14.02 |

FOREIGN PATENT DOCUMENTS

| | | | | |
|---|---|---|---|---|
| DE | | 118825 | 8/1907 | |
| DE | | 3609275 | 9/1987 | |
| EP | | 551956 A1 | * 7/1993 | ............. A01J/7/00 |
| WO | WO 01/19169 A | | 3/2001 | |

* cited by examiner

Primary Examiner—Robert P. Swiatek
Assistant Examiner—Joan M. Olszewski
(74) Attorney, Agent, or Firm—Howrey Simon Arnold & White; Jacobus C. Rasser; David P. Owen

(57) ABSTRACT

A device for automatically milking an animal. The device is provided with at least two teat cups to be connected to respective teats of the animal. The milking vacuum unit generates a milking vacuum in the teat cups, which milking vacuum unit comprises at least two vacuum lines that are each connectable to a respective teat cup. The milking vacuum unit comprises a common vacuum pump and a common buffer vessel to which vacuum can be applied by use of the common vacuum pump. All vacuum lines are connectable to the common buffer vessel. An individual buffer vessel is provided in each vacuum line and is disposed between the common buffer vessel and the respective teat cup. An individual buffer vessel is provided with a respective individual vacuum pump for applying vacuum to the individual buffer vessel.

23 Claims, 5 Drawing Sheets

DEVICE FOR AUTOMATICALLY MILKING AN ANIMAL

CROSS REFERENCE TO RELATED APPLICATIONS

This application claims priority from Dutch patent application no. 1020784, filed 6 Jun. 2002, the contents of which are hereby incorporated by reference in their entirety. This application also relates to U.S. patent application Ser. No. 10/249,958 by the present inventor entitled "A method of and a device for automatically milking an animal" filed concurrently herewith, the contents of which are hereby incorporated by reference in their entirety.

BACKGROUND OF INVENTION

1. Field of the Invention

The invention relates to the field of milking and more particularly to a device for automatically milking an animal.

2. Description of the Related Art

Devices are known for automatically milking dairy animals. Such devices may be provided with at least two teat cups for connection to respective teats of the animal and a milking vacuum unit for generating a milking vacuum in the teat cups. The milking vacuum unit may comprise at least two vacuum lines that are each connectable to a respective teat cup.

A device is known from DE-A1-3609275, the contents of which are hereby incorporated by reference in their entirety, by means of which animal-dependent or udder quarter-dependent milking is possible.

SUMMARY OF INVENTION

The invention aims inter alia at providing an alternative and improved device for automatically milking an animal.

For this purpose, according to the invention, a device for automatically milking an animal of the above-described type comprises at least two teat cups for connection to respective teats of the animal and a milking vacuum unit for generating a milking vacuum in the teat cups, the milking vacuum unit comprising at least two vacuum lines that are each connectable to a respective teat cup, a common vacuum pump, a common buffer vessel to which vacuum can be applied by means of the common vacuum pump, the at least two vacuum lines being connectable to the common buffer vessel, an individual buffer vessel in each vacuum line disposed between the common buffer vessel and the respective teat cup and being connectable to the common buffer vessel by a first vacuum line portion and being connectable to the respective teat cup by a second vacuum line portion, and an individual vacuum pump for each individual buffer vessel for applying vacuum to the respective individual buffer vessel. Due to the fact that the milking vacuum unit comprises both a common vacuum pump and an individual vacuum pump per individual buffer vessel, it is possible to apply a milking vacuum per teat cup in an accurate and reproducible way.

It is in particular advantageous if the common vacuum pump for applying vacuum to the common buffer vessel is a frequency-controlled vacuum pump.

For the purpose of providing a vacuum pressure with an accurate value, in an embodiment of a device according to the invention, a vacuum sensor for measuring the vacuum is included in the common buffer vessel. The common vacuum pump can preferably be controlled with the aid of data from the vacuum sensor for measuring the vacuum in the common buffer vessel.

In an embodiment of a device according to the invention, an individual buffer vessel has an upper side, in which an air inlet control valve is disposed. Moreover, an individual buffer vessel may be provided with a vacuum sensor for measuring the vacuum in the individual buffer vessel. For obtaining an accurate milking vacuum, an individual vacuum pump or the air inlet control valve can be controlled with the aid of data from the vacuum sensor for measuring the vacuum in the individual buffer vessel.

For generating a correct milking vacuum the dimensions of the vacuum line portions may also be of importance. A particularly advantageous device is obtained if the first vacuum line portion has a maximum capacity of approximately 3500 cm$^3$/s and/or if the second vacuum line portion has a maximum capacity of approximately 12000 cm$^3$/s.

The invention may be applied in particular to a device comprising a milking robot with a robot arm for connecting a teat cup to a teat, at least one individual buffer vessel being disposed on or in the robot arm.

An embodiment of a device according to the invention is characterized in that each teat cup is provided with a teat cup liner forming a pulse chamber in the teat cup, in that the device is provided with a pulsator unit for generating a pulsation vacuum in a pulse chamber, with a control device provided with software for controlling the functioning of the vacuum unit or the pulsator unit in such a way that all udder quarters will be milked-out according to a predetermined chronological order, in particular at least substantially simultaneously. Due to the fact that the milking intensity is controlled in such a way that all udder quarters will be milked-out according to a predetermined chronological order, the milking can take place in an animal-friendly way. In some devices for automatically milking an animal it is customary that after the milking another treatment takes place. The performance of such a post-treatment cannot always take place immediately after the milking because, for the milking of the other udder quarters, equipment may be required that makes the post-treatment difficult, if not impossible. In such cases, a teat of a milked-out udder quarter can be post-treated only when all other udder quarters have been milked-out, which may lead sometimes to a long waiting time for the post-treatment. This may have harmful effects for the relevant udder quarter, for example in relation to its health and the health of the animal. By controlling the relevant components, according to the invention, in such a way that the udder quarters will be milked-out according to a predetermined chronological order, the milking can be optimally tuned to the further treatments of the teats, so that the animal is milked in a beneficial manner (by which is also meant a medically safe manner). It is pointed out here that a short waiting time before a teat of a milked-out udder quarter is post-treated is not harmful in many cases.

For the purpose of monitoring the progress of the milking and also monitoring the health of the animal, a device according to the invention may be provided with at least one milking parameter meter for determining, during milking, per udder quarter a value of a milking parameter, a control device controlling the milking of each udder quarter by means of the milking vacuum unit or the pulsator unit at least partially with the aid of the determined value of the milking parameter. Here it is advantageous if the milking parameter meter can be connected to the control device for supplying to the control device data in relation to the value of the milking parameter, the control device controlling the functioning of the milking vacuum unit or the pulsator unit per udder quarter with the aid of the data in relation to the value of the milking parameter.

In particular if the milking parameter meter comprises a quarter milking duration meter for determining the quarter milking duration per udder quarter, and if the device is provided with a calculating device for determining an expected quarter milking duration from historical quarter milking durations, the milking intensities for the different udder quarters can be adjusted prior to the milking.

The milking intensity is adjusted in particular by controlling the functioning of the milking vacuum unit or the pulsator unit per quarter.

BRIEF DESCRIPTION OF DRAWINGS

An embodiment of the invention will now be explained in further detail by way of example only with reference to the accompanying figures, in which.

DETAILED DESCRIPTION

Figure 1:
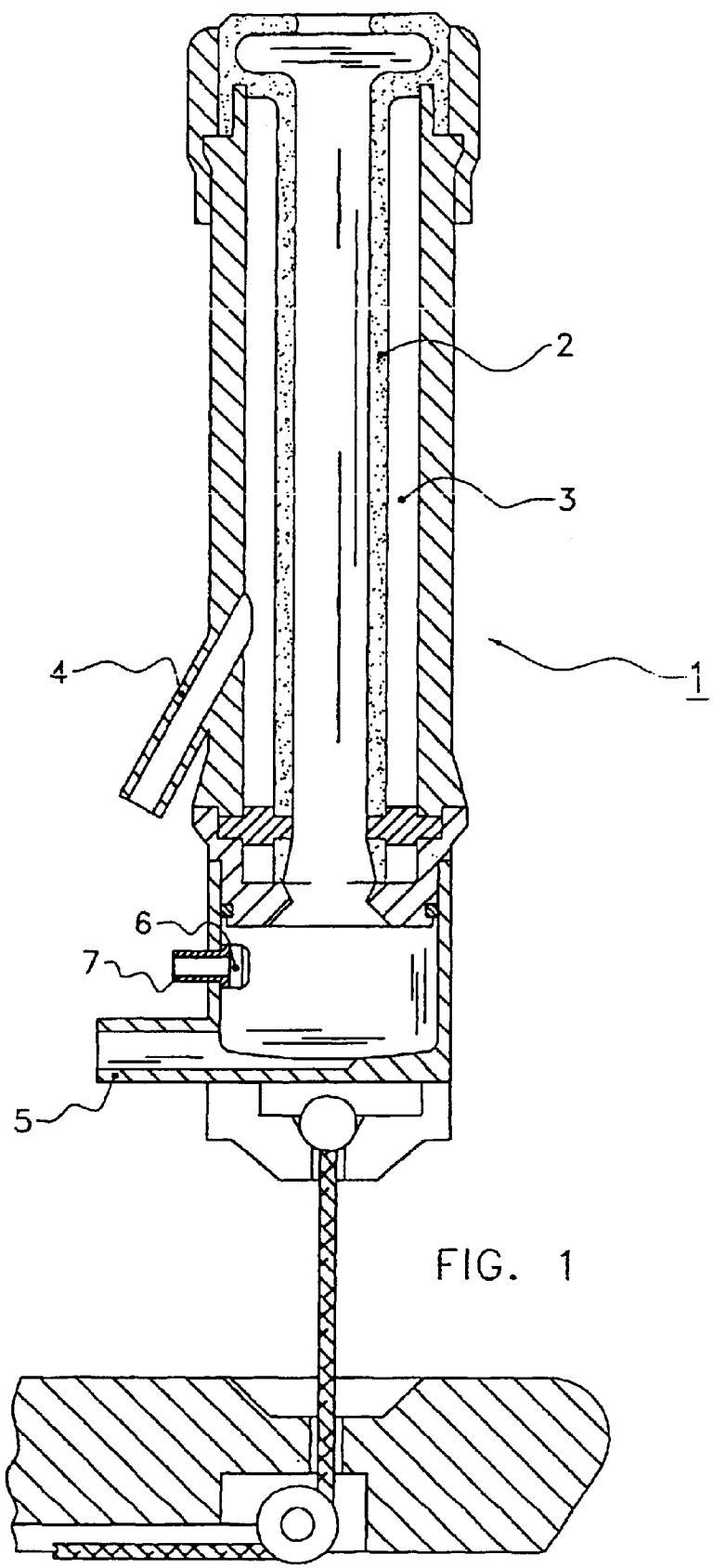
FIG. 1 shows a teat cup in which a milking vacuum gauge is disposed.

FIG. 1 shows a teat cup 1 with a teat liner 2 and a pulse chamber 3. To the pulse chamber 3 there is connected, via a pulsation line 4, a (non-shown), preferably computer-controlled, adjustable pulsator. Near the lower side of the teat cup 1 there is further disposed a milk line 5. In the lower part of the teat cup 1 there is disposed a milking vacuum gauge 6. The milking vacuum gauge 6 is connected, via a line 7, to a computer or a calculating unit. With the aid of the computer and/or the calculating unit, the computer-controlled adjustable pulsator can be controlled on the basis of the signal emitted by the milking vacuum gauge 6, which signal indicates the value of the milking vacuum.

The control of the pulsator will now be explained in further detail with reference to the diagrams in FIG. 5. Here the X-axis is the time axis, whereas the Y-axis indicates the underpressure of the milking vacuum and the pulsation vacuum.

Figure 5:
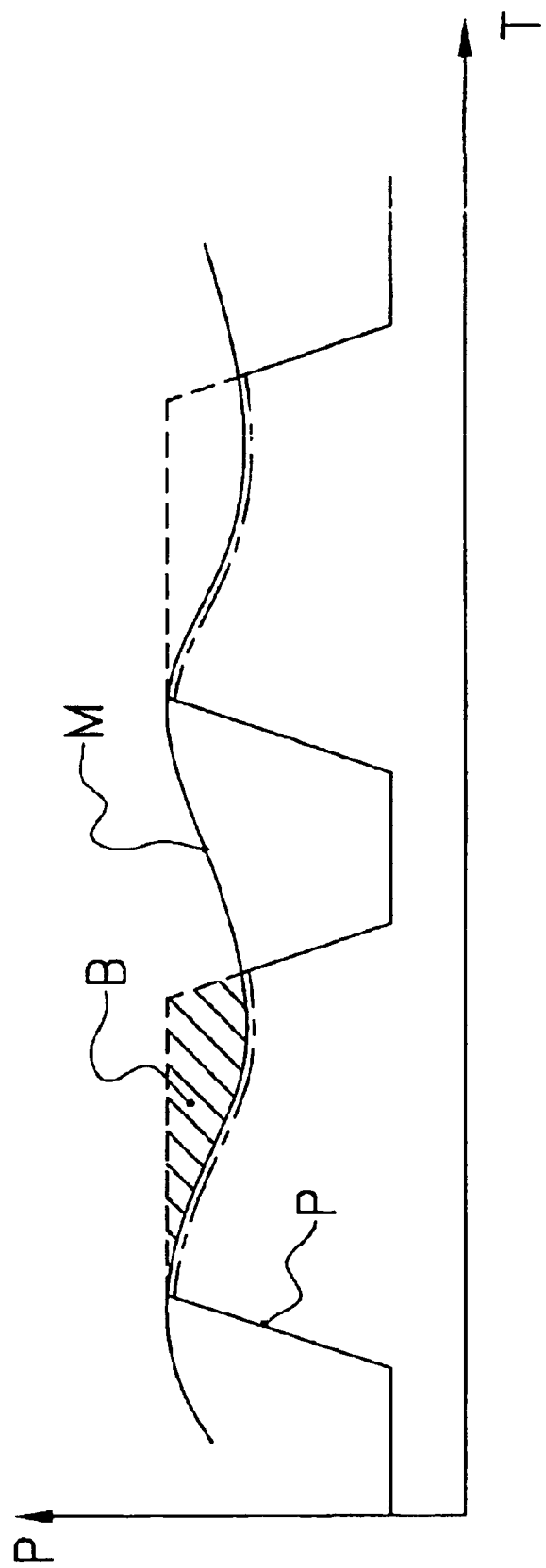
FIG. 5 shows schematically a diagram of the pulsation and milking vacuum curve.

FIG. 5 shows the pulsation curve P indicating the pulsation vacuum generated by the pulsator for one teat. Here the part of the pulsation curve P that is represented by a broken line indicates the pulsation vacuum that is used in a previously known device for automatically milking. FIG. 5 furthermore shows the milking vacuum curve M as measured by the milking vacuum gauge 6. As shown, the milking vacuum varies during milking. The pulsation vacuum also varies and may assume a maximum underpressure value.

In a previously known device for automatically milking an animal the teat of an animal is unnecessarily loaded in the shaded area B situated between the part of the pulsation curve P represented by the broken lines and the relevant part of the milking vacuum curve. This loading may lead to irritation and even inflammation of the teat.

Such a loading of the teat is prevented in that the computer and/or the calculating unit (in general a control device) uses the value of the milking vacuum measured by the milking vacuum gauge 6 for the control of the pulsator for adjusting the pulsation vacuum. Here the relevant components are controlled in such a way that the maximum underpressure value of the pulsation vacuum is equal to or is a fixed value lower than the measured milking vacuum. This is shown in FIG. 5 by the dashed-dotted line belonging to the pulsation curve P.

Figure 2:
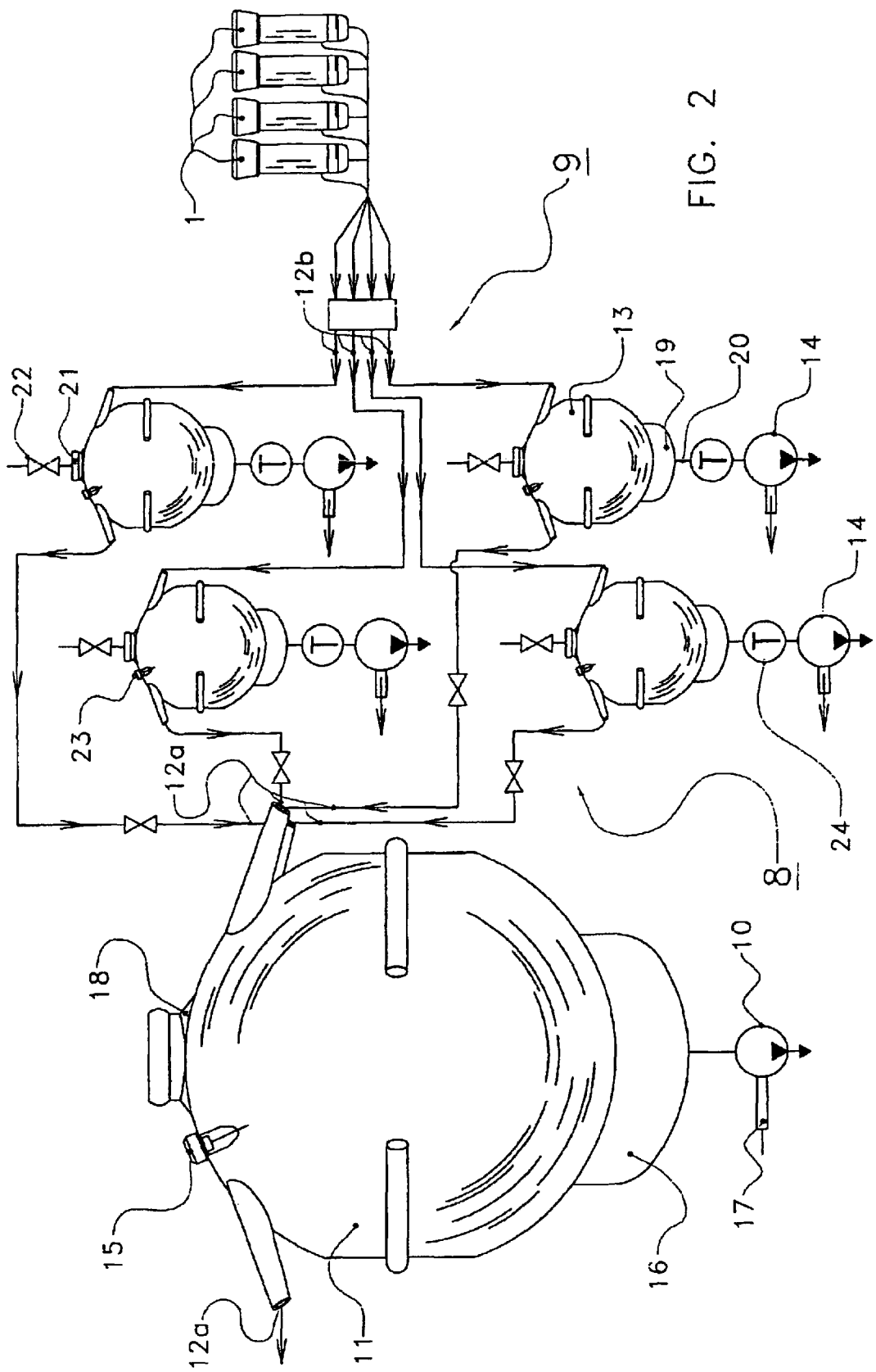
FIG. 2 shows schematically a device for automatically milking an animal.

FIG. 2 shows schematically a device 8 for automatically milking an animal. In said device the pulsator is not shown, because the pulsator and the control thereof are known per se, such as for example from DE-A1-3609275.

The device 8 is provided with at least two teat cups (in the embodiment shown four) to be connected to respective teats of the animal. A milking vacuum unit 9 generates the milking vacuum in the teat cups 1.

The milking vacuum unit 9 is provided with a common vacuum pump 10 and with a common buffer vessel 11 to which vacuum can be applied by means of the common vacuum pump. In the embodiment shown the common vacuum pump 10 for applying vacuum to the common buffer vessel 11 is a frequency-controlled vacuum pump. The common buffer vessel 11 comprises a vacuum sensor 15 for measuring the vacuum in the common buffer vessel 11. The vacuum in the common buffer vessel 11 can be controlled by means of the common vacuum pump 10 with the aid of data from the vacuum sensor 15. The common buffer vessel 11 has for example a content of approximately 30 dm$^3$.

Figure 3:
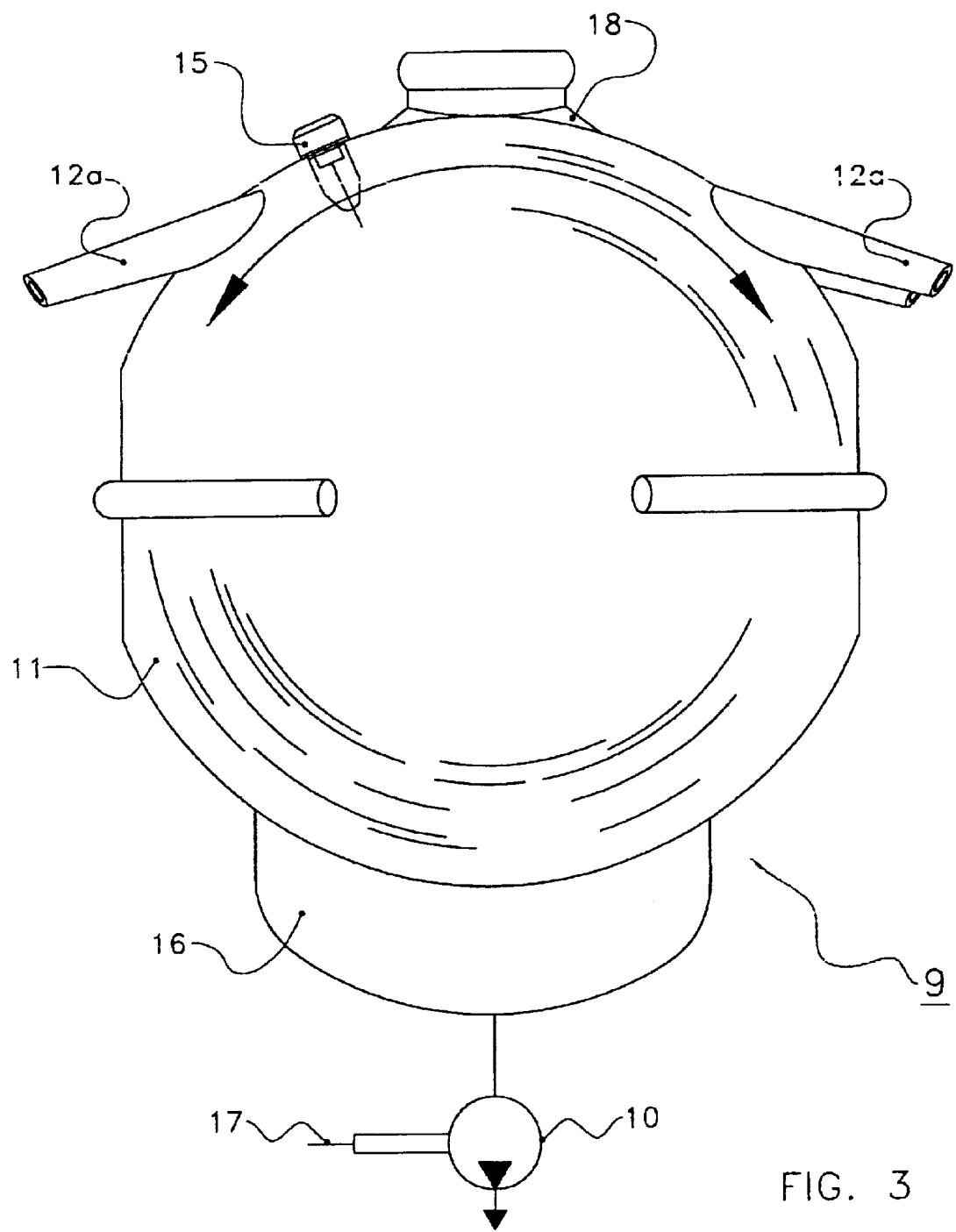
FIG. 3 shows schematically a common buffer vessel of the device shown in FIG. 2.

In the embodiment shown, the common buffer vessel 11 has a lower side 16 (FIG. 3). In said lower side 16 there is arranged an outlet 17 in which the common vacuum pump 10 for applying vacuum to the common buffer vessel 11 is disposed. The common buffer vessel 11 also has an upper side 18. Each first vacuum line portion 12a can be connected to the upper side 18 of the common buffer vessel 11.

An individual buffer vessel 13 is included in each vacuum line 12a and is positioned between the common buffer vessel 11 and the respective teat cup 1. Each individual buffer vessel 13 can be connected to the common buffer vessel 11 via a first vacuum line portion 12a and to the respective teat cup 1 via a second vacuum line portion 12b. For each individual buffer vessel 13 the device 8 comprises a respective individual milk pump 14 (with milk meter, if desired) for applying vacuum to the individual buffer vesselDue to the fact that the milking vacuum unit 9 comprises both a common vacuum pump 10 and an individual milk pump 14 per individual buffer vessel 13, it is possible to apply a milking vacuum per teat cup 1 in an accurate and reproducible way.

Figure 4:
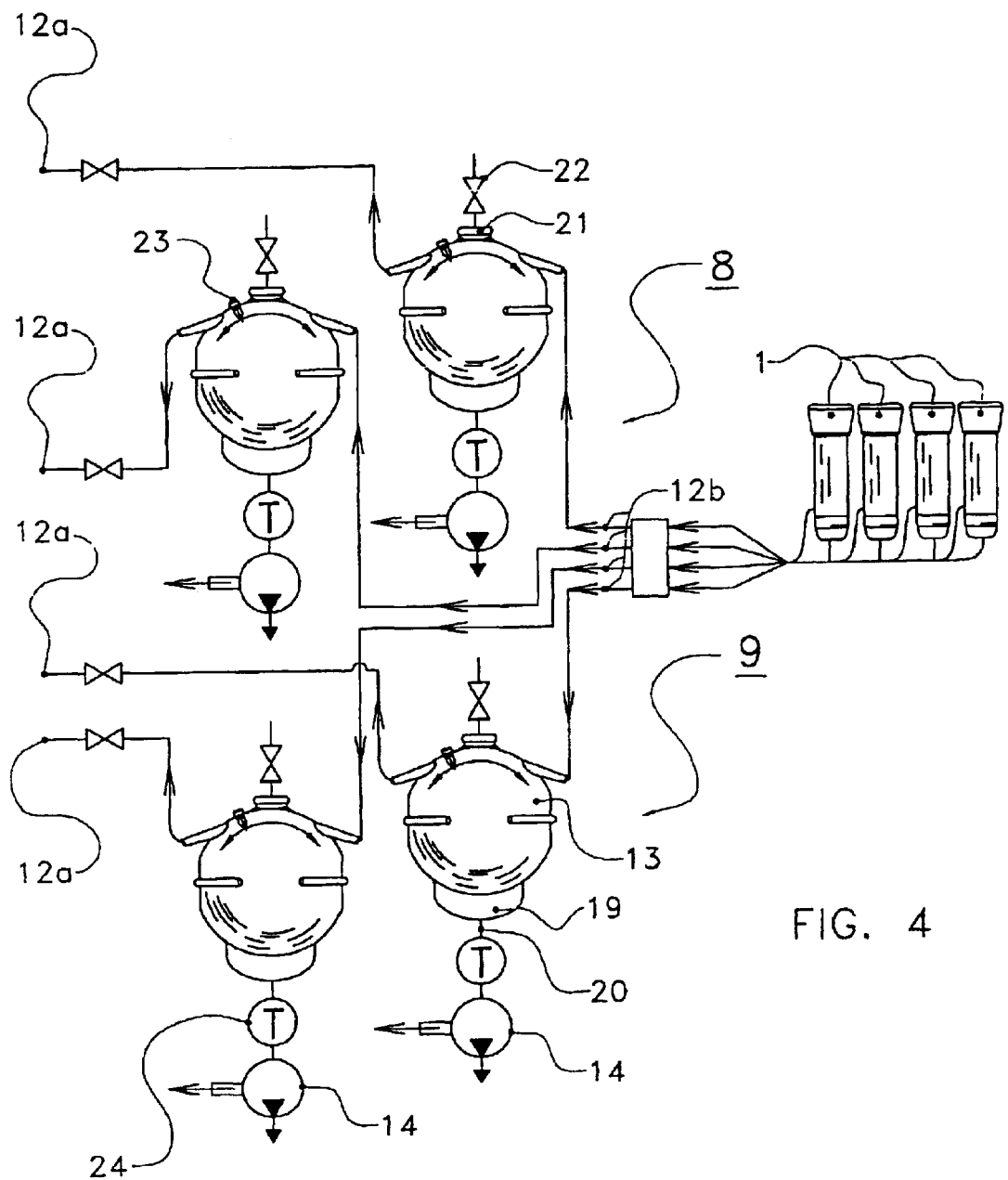
FIG. 4 shows schematically an individual buffer vessel of the device shown in FIG. 2.

Each individual buffer vessel 13 has a lower side 19 (FIG. 4). In said lower side 19 there is arranged an outlet 20 in which the individual milk pump 14 for applying vacuum to the individual buffer vessel 13 is disposed. The individual buffer vessel 13 also has an upper side 21 to which the respective first vacuum line portion 12a can be connected. Furthermore the second vacuum line portion 12b can also be connected to the upper side 21 of the respective individual buffer vessel 13. In the upper side of the individual buffer vessel 13 there is also disposed an air inlet control valve 22. An individual buffer vessel 13 has for example a content of 1.5 dm$^3$, and also serves as a milk separator.

Analogous to the common buffer vessel, each individual buffer vessel 13 is provided with a vacuum sensor 23 for measuring the vacuum in the individual buffer vessel 13. Here the individual milk pump 14 and/or the air inlet control valve 22, and thus the vacuum in the individual buffer vessel 13, can be controlled with the aid of data from the vacuum sensor 23.

In the first and second vacuum line portion there are disposed (non-shown) controllable valves exercising a function comparable to that of the valves in conventional vacuum line portions.

For applying an even more accurate milking vacuum, if desired, the dimensions of vacuum line portions 12a, 12b are also of importance. A particularly accurately adjustable milking vacuum is obtained if the first vacuum line portion 12a has a maximum capacity of approximately 3500 cm$^3$/s and/or if the second vacuum line portion 12b has a maximum capacity of approximately 12000 cm$^3$/s.

If the device comprises a milking robot known per se with a robot arm for connecting a teat cup to a teat, it is advantageous if at least one individual buffer vessel 13 is disposed on or in the robot arm.

By means of the device described it is possible to generate a very accurate milking vacuum in the teat cup under the teat. It is further possible to control said milking vacuum, as well as the pulsation vacuum and any other milking process parameters, by means of the control device provided with software (for example a computer and/or a calculating unit) in such a way that all udder quarters will be milked-out at least substantially according to a predetermined chronological order, in particular simultaneously.

Such a chronological order may be for example that the udder quarters will be milked-out approximately 1 minute (an other period of time is also possible, of course) after each other. In this way a robot arm can remove the teat cups one after the other from the teats, or the teats can be post-treated one after the other. When the udder quarters have been milked-out at least substantially simultaneously, the teat cups can be removed from the teats simultaneously, so that the milking has a defined end time, which offers advantages.

The milking intensity can be controlled by varying in particular at least one milking process parameter chosen from the group consisting of: milking vacuum, rising rate of the pulsation vacuum, rate of descent of the pulsation vacuum and release-squeeze ratio. The manner in which such process parameters are varied is known per se, although for other purposes, and needs not to be set out here in further detail.

The device 8 is further provided with at least one milking parameter meter 24, in the embodiment shown a thermometer, for determining, during milking, for each udder quarter a value of a milking parameter (for example the temperature) of the milk obtained. It is pointed out here that the location of the milking parameter meter 24 in the figure is purely schematically, and it will be obvious that it may also be disposed at other suitable places. The control device is in particular suitable for controlling the milking of each udder quarter by means of the milking vacuum unit or the pulsator unit at least partially with the aid of the determined value of the milking parameter (for example the temperature). When for example the temperature of the milk obtained demonstrates an unexpected increase, which could be an indication of for example a too high milking vacuum in the teat cup under the teat, the control device is capable of adjusting the milking intensity for the relevant teat in such a way that the temperature comes again within nominal values. Due to the fact that the milking intensity is adjusted for the relevant udder quarter, the control unit also controls the milking intensities of the other udder quarters, so that the udder quarters have again been milked-out according to the predetermined chronological order. Said control preferably takes place fully automatically, of course.

Besides the temperature, other milking parameters, such as fat content, protein content, milk flow, conductivity, colour and the like may be applied, of course.

The milking parameter meter is in particular a quarter milking duration meter known per se for determining the quarter milking duration per udder quarter. The device 8 is then provided with a calculating device for determining an expected quarter milking duration from historical quarter milking durations. The calculating device is in particular suitable for determining the average of the quarter milking duration of a previously adjustable number of milking runs (for example eight or ten, but any other number may be applied as well) of said udder quarter. It is thus possible to adjust, prior to the milking, the milking intensities per udder quarter on the basis of the expected quarter milking durations. In particular it is possible to control the functioning of the milking vacuum unit or the pulsator unit.

Thus, when the measurement of a momentary milking parameter gives cause for it, it is possible to adjust the milking intensity during milking.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for automatically milking an animal, the device comprising at least two teat cups for connection to respective teats of the animal and a milking vacuum unit for generating a milking vacuum in the teat cups, the milking vacuum unit comprising:
    at least two vacuum lines that are each connectable to a respective teat cup;
    a common vacuum pump;
    a common buffer vessel to which vacuum can be applied by means of the common vacuum pump, the at least two vacuum lines being connectable to the common buffer vessel;
    an individual buffer vessel in each vacuum line disposed between the common buffer vessel and the respective teat cup and being connectable to the common buffer vessel by a first vacuum line portion and being connectable to the respective teat cup by a second vacuum line portion; and
    an individual vacuum pump for each individual buffer vessel for applying vacuum to the respective individual buffer vessel.

2. The device as claimed in claim 1, wherein the common vacuum pump for applying vacuum to the common buffer vessel is a frequency-controlled vacuum pump.

3. The device as claimed in claim 1, wherein the common buffer vessel comprises a vacuum sensor for measuring the vacuum in the common buffer vessel.

4. The device as claimed in claim 3, wherein the common vacuum pump can be controlled with the aid of data from the vacuum sensor for measuring the vacuum in the common buffer vessel.

5. The device as claimed in claim 1, wherein the common buffer vessel has a lower side with an outlet in which the common vacuum pump for applying vacuum to the common buffer vessel is disposed.

6. The device as claimed in claim 1, wherein the common buffer vessel has an upper side, to which each first vacuum line portion can be connected.

7. The device as claimed in claim 1, wherein an individual buffer vessel has a lower side with an outlet in which the individual vacuum pump for applying vacuum to the individual buffer vessel is disposed.

8. The device as claimed in claim 7, wherein an individual buffer vessel has an upper side, to which the respective first vacuum line portion can be connected.

9. The device as claimed in claim 8, wherein the second vacuum line portion can be connected to the upper side of the respective individual buffer vessel.

10. The device as claimed in claim 1, wherein an individual buffer vessel has an upper side with an air inlet control valve.

11. The device as claimed in claim 1, wherein an individual buffer vessel is provided with a vacuum sensor for measuring the vacuum in the individual buffer vessel.

12. The device as claimed in claim 11, wherein an individual vacuum pump can be controlled with the aid of data from the vacuum sensor for measuring the vacuum in the individual buffer vessel.

13. The device as claimed in claim 11, wherein the individual buffer vessel has an air inlet control valve controllable with the aid of data from the vacuum sensor for measuring the vacuum in the respective individual buffer vessel.

14. The device as claimed in claim 1, wherein the milking vacuum unit is provided with controllable valves disposed in the first and the second vacuum line portion.

15. The device as claimed in claim 1, wherein the first vacuum line portion has a maximum capacity of approximately 3500 cm3/s.

16. The device as claimed in claim 15, wherein the second vacuum line portion has a maximum capacity of approximately 12000 cm3/s.

17. The device as claimed in claim 1, wherein the device comprises a milking robot with a robot arm for connecting a teat cup to a teat, at least one individual buffer vessel being disposed on or in the robot arm.

18. The device as claimed in claim 1, wherein each teat cup comprises a teat cup liner forming a pulse chamber in the teat cup, the device further comprising a pulsator unit for generating a pulsation vacuum in a pulse chamber, and a control device provided with software for controlling the functioning of the vacuum unit or the pulsator unit in such a way that all udder quarters will be milked-out according to a predetermined chronological order.

19. The device as claimed in claim 18, wherein the device comprises at least one milking parameter meter for determining, during milking, per udder quarter a value of a milking parameter, the control device controlling the milking of each udder quarter by means of the milking vacuum unit or the pulsator unit at least partially with the aid of the determined value of the milking parameter.

20. The device as claimed in claim 19, wherein the milking parameter meter can be connected to the control device for supplying to the control device data in relation to the value of the milking parameter, the control device controlling the functioning of the milking vacuum unit or the pulsator unit per udder quarter with the aid of the data in relation to the value of the milking parameter.

21. The device as claimed in claim 19, wherein the milking parameter meter comprises a quarter milking duration meter for determining the quarter milking duration per udder quarter, the device further comprising a calculating device for determining an expected quarter milking duration from historical quarter milking durations.

22. The device as claimed in claim 21, wherein the calculating device determines the average of the quarter milking duration of a previously adjustable number of milking runs of said udder quarter.

23. The device as claimed in claim 21, wherein the calculating device can be connected, prior to a milking run of an animal, to the control device for supplying to the control device data in relation to the expected quarter milking duration, the control device controlling, prior to the milking, the functioning of the milking vacuum unit or the pulsator unit per quarter.

* * * * *